(No Model.)
C. HUKE.
WORK HOLDING DEVICE FOR METAL SLOTTING MACHINES.
No. 281,272. Patented July 17, 1883.
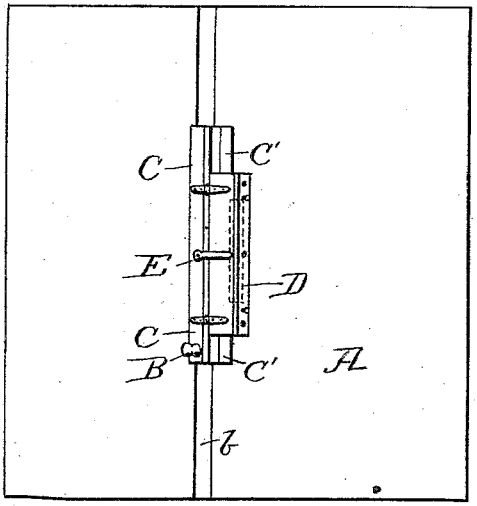
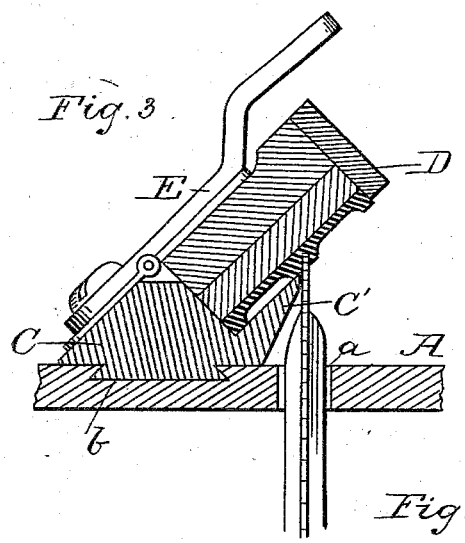
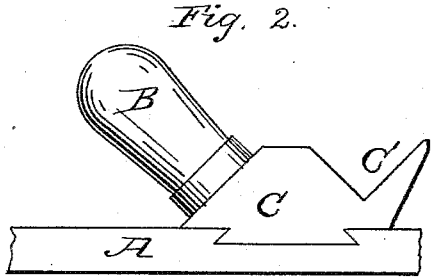
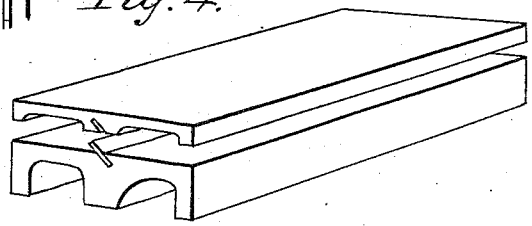
Witnesses:
S. T. Schoff
J. D. Nills
Inventor:
Charles Huke
By James H. Coyne
Att'y

UNITED STATES PATENT OFFICE.

CHARLES HUKE, OF CHICAGO, ILLINOIS.

WORK-HOLDING DEVICE FOR METAL-SLOTTING MACHINES.

SPECIFICATION forming part of Letters Patent No. 281,272, dated July 17, 1883.

Application filed December 30, 1882. (No model.)

*To all whom it may concern:*

Be it known that I, CHARLES HUKE, of Chicago, in the county of Cook and State of Illinois, have invented certain new and useful Improvements in Machines for Cutting Oblique Slots in Stereotype Plates or Blocks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to cut an oblique slot—preferably longitudinal—in the contiguous or engaging surfaces of a stereotype plate and block upon which the same is mounted.

I would have it understood that I disclaim any and all invention in the uniting of a stereotype-plate to block or base by inserting a flat key in oblique slots made in the engaging-surfaces of said plate and base in such manner as to make a continuous slot of the same inclination and dimensions; but what I do claim is the machine for cutting said slots at a corresponding position and at the same angle in both the plate and base. This I accomplish by a carrier so constructed as to hold either said plate or base securely in position and carry the same over and within range of the cutting device at a given angle, substantially as hereinafter described, and as illustrated in the drawings, in which—

Figure 1 is a plan view. Fig. 2 is an end view of the carrier. Fig. 3 is a cross-section of the carrier and cutting devices; and Fig. 4 is a view showing the location, inclination, and dimensions of the slots in the plate and base.

In the drawings, A represents a bed-plate resting upon a table-shaped frame, which has a longitudinal slot or opening, $a$, near its center, through which a rotary saw or suitable cutting device projects. The rotary saw is secured on the end of a shaft, which is properly journaled in the frame, and which is driven through the medium of a belt and pulley or other suitable mechanism. Running parallel to the slot $a$, longitudinally over the bed-plate, is a dovetail mortise, $b$, adapted to receive the tenon $c$, projecting from the under surface of the carrier C, and serves as a guide for the same. The body of the carrier is conical in cross-section, with the apex cut off, and maintains the same proportions throughout its entire length, which latter corresponds to the length of the column of stereotype matter desired to be slotted. The angles of the side faces of the carrier strike the bed-plate an equal distance from either side of the mortise $b$, and the end of the carrier opposing the cutting movement of the saw is provided with a handle or suitable hand-grasp, B.

On the side of the carrier C, adjacent to the opening $a$, projects a ledge, C', the upper surface of which is preferably at right angles to the contiguous side of the carrier. This ledge travels the entire length of the carrier, and is adapted to hold the plate or block at a given angle to the saw and within the cutting range of the same. In order to hold the plate or block securely upon the ledge while being slotted, I hinge to the carrier C a leaf, D, composed of two horizontal layers of wood—or metal, if desired—and a vertical or end strip of a width sufficient to cover the outer side edges and extend slightly below the under surface of the lower horizontal layer, so that when said leaf is closed down upon the plate or block it will not move laterally when subjected to the upward or cutting pressure of the saw or cutting device.

It will be noticed in Fig. 4 the base is thicker than the plate. It is to accommodate this difference in thickness between base and plate that I make the leaf D of two horizontal pieces. Thus when I desire to cut the slot in the base I remove the lower horizontal piece, and when I wish to slot the plate I insert it. In both instances I securely hold the part to be slotted.

E represents a latch, which is pivoted to the carrier, and which prevents the leaf from independently lifting.

The principal feature of my invention is its ability to do rapidly and well the work designed for it. It will, however, be understood that I do not consider it absolutely necessary to use the leaf to hold in position the plate or base, for that could be done by the hand, although not so well; nor do I confine myself to the exact formation of the carrying mechanism, for that could be changed without departing from the spirit of my invention; but

What I claim as new, and desire to secure by Letters Patent, is—

1. A carrier, preferably conical in cross-section, having a dovetail tenon adapted to enter and move longitudinally in a dovetail groove or guide, and provided with a ledge projecting from its side face nearest the saw, the upper surface of which is preferably at right angles to said side, the whole being adapted to carry and hold at an angle to and over a saw or other suitable cutting mechanism a stereotype or electrotype plate or base, upon which the same is mounted, as and for the purpose set forth.

2. The combination, with a carrier, C, provided with a ledge, C', of a leaf, D, and latch E, substantially as and for the purpose set forth.

3. The combination of a carrier, C, with a saw or other suitable cutting device, whereby said carrier holds the material to be cut at a vertical angle to and carries said material within the cutting range of the saw, substantially as set forth.

In testimony that I claim the foregoing as my own I hereunto affix my signature in presence of two witnesses.

CHARLES HUKE.

Witnesses:
JAMES H. COYNE,
FRANK D. THOMASON.